(12) United States Patent
Clarner

(10) Patent No.: US 7,520,033 B2
(45) Date of Patent: Apr. 21, 2009

(54) MULTIPLE-CROOK MALE TOUCH FASTENER ELEMENTS

(75) Inventor: Mark A. Clarner, Concord, NH (US)

(73) Assignee: Velcro Industries B.V., Curacao (NL)

(*) Notice: Subject to any disclaimer, the term of this patent is extended or adjusted under 35 U.S.C. 154(b) by 714 days.

(21) Appl. No.: 10/688,320

(22) Filed: Oct. 15, 2003

(65) Prior Publication Data

US 2005/0081346 A1 Apr. 21, 2005

(51) Int. Cl.
A44B 18/00 (2006.01)
(52) U.S. Cl. .......................... 24/452; 24/450
(58) Field of Classification Search ............ 24/452; 428/100
See application file for complete search history.

(56) References Cited

U.S. PATENT DOCUMENTS

| 3,387,345 | A | | 6/1968 | Savoir |
|---|---|---|---|---|
| 3,426,363 | A | | 2/1969 | Girard |
| 4,165,555 | A | | 8/1979 | Boxer et al. |
| 4,402,690 | A | | 9/1983 | Redfern |
| 4,410,327 | A | | 10/1983 | Baggaley |
| 4,775,310 | A | | 10/1988 | Fischer et al. |
| 4,870,725 | A | | 10/1989 | Dubowik |
| 4,984,339 | A | | 1/1991 | Provost et al. |
| 5,067,210 | A | * | 11/1991 | Keyaki .................. 24/452 |
| 5,176,670 | A | | 1/1993 | Roessler et al. |
| 5,318,741 | A | | 6/1994 | Thomas |
| 5,325,569 | A | | 7/1994 | Goulait et al. |
| 5,326,415 | A | | 7/1994 | Thomas et al. |
| 5,326,612 | A | | 7/1994 | Goulait |
| 5,368,549 | A | | 11/1994 | McVicker |
| 5,369,852 | A | | 12/1994 | Higashinaka |
| 5,369,853 | A | | 12/1994 | Okawa et al. |
| 5,392,498 | A | | 2/1995 | Goulait et al. |
| 5,399,177 | A | | 3/1995 | Blaney et al. |
| 5,399,418 | A | | 3/1995 | Hartmanns et al. |
| 5,537,720 | A | * | 7/1996 | Takizawa et al. ........... 24/452 |
| 5,540,673 | A | | 7/1996 | Thomas et al. |
| 5,607,345 | A | | 3/1997 | Barry et al. |
| 5,615,460 | A | | 4/1997 | Weirich et al. |
| 5,655,268 | A | | 8/1997 | Keyaki et al. |
| 5,669,120 | A | | 9/1997 | Wessels et al. |
| 5,685,050 | A | * | 11/1997 | Murasaki ................. 24/452 |
| 5,755,015 | A | * | 5/1998 | Akeno et al. ............. 24/452 |
| 5,781,969 | A | * | 7/1998 | Akeno et al. ............. 24/452 |
| 5,845,375 | A | | 12/1998 | Miller et al. |
| 5,913,482 | A | * | 6/1999 | Akeno .................... 24/452 |

(Continued)

FOREIGN PATENT DOCUMENTS

GB 2 355 490 4/2001

(Continued)

Primary Examiner—Robert J Sandy
(74) Attorney, Agent, or Firm—Fish & Richardson P.C.

(57) ABSTRACT

A plastic male touch fastener component has a sheet-form base and an array of male fastener elements, each including a stem extending outwardly from and integrally with the sheet-form base, and two heads extending in essentially opposite directions in an engagement plane from a distal end of the stem to corresponding tips, the fastener element having an upper surface that defines a well between the heads. The fastener element is dimensioned with proportionately large heads for the size of the fastener, that nevertheless have clearance to distend to release loops. The shape of the fastener element also allows for demold from closed mold cavities.

13 Claims, 7 Drawing Sheets

U.S. PATENT DOCUMENTS

| | | | |
|---|---|---|---|
| 5,974,635 A | 11/1999 | Murasaki | |
| 6,039,911 A | 3/2000 | Miller et al. | |
| 6,127,018 A * | 10/2000 | Akeno et al. | 428/100 |
| 6,131,251 A | 10/2000 | Provost | |
| 6,163,939 A | 12/2000 | Lacey et al. | |
| 6,484,371 B1 * | 11/2002 | Romanko et al. | 24/452 |
| 2002/0162197 A1 | 11/2002 | Romanko et al. | |

FOREIGN PATENT DOCUMENTS

| | | |
|---|---|---|
| WO | WO97/46129 | 12/1997 |

* cited by examiner

MULTIPLE-CROOK MALE TOUCH FASTENER ELEMENTS

TECHNICAL FIELD

This invention relates to arrays of male touch fastener elements with stems formed integrally with an interconnecting base, and more particularly to such fastener elements formed to have two generally oppositely-directed engaging heads extending from each stem.

BACKGROUND

Early male touch fastener products were generally woven materials, with hooks formed by cut filament loops. More recently, arrays of very small touch fastener elements have been formed by molding the fastener elements, or at least the stems of the elements, of resin forming an interconnecting sheet of material. Arrays of male fastener elements have also been formed contiguously with a sheet-form base by extruding profile rails with a thicker base, slitting the rails with transverse slits to form rows of discrete fastener elements, and then stretching the base to separate the fastener elements within each row. Such a method is referred to in the industry as 'cut-and-stretch.'

Molding and/or extrusion enables fastener elements to be formed with stems that taper from a relatively wide base up to the crooks that engage loops, resulting in better lateral stability. Both of these methods are generally much more cost-effective than weaving methods, and can be employed to create extremely small, densely-spaced hooks.

To be molded in blind, fastener element-shaped molding cavities, the fastener element shape must allow for 'demolding' the fastener element, such as by pulling it from its cavity without opening the cavity. Cut-and-stretch methods, on the other hand, do not require such shape considerations, but are generally limited, in present practice, to creating fastener elements with flat, parallel, cut faces.

Both methods are useful for forming double-headed fastener elements, each with two heads that face in generally opposite directions. Such hooks are known in the industry as 'palm tree' type fastener elements. With cut-and-stretch, the heads tend to extend across the fastener tape, perpendicular to the extrusion direction, while continuous molding methods, such as taught by Fisher, U.S. Pat. No. 4,775,310, are most efficient at forming palm tree hooks with heads that face in the longitudinal material flow direction.

In most applications, male fastener elements are designed to releasably engage with a mating female fastener component carrying a field of loops or fibers. To engage the loops, the male fastener elements must penetrate the field of fibers at least until the tips of the engaging fastener element heads have sufficiently extended beyond some of the fibers, such that the fibers can be engaged within the crooks of the heads. Thus, enhancing penetration tends to lead to longer, more slender hooks.

Subsequent to engagement, retention of an engaged fiber or loop depends, at least for loads within the ability of the loop to resist breakage, upon resistance of the hook to distention and/or breakage. Distention is the opening of the crook under load of an engaged loop. For high cycle life applications, breakage of either both loops and hooks is undesirable. Thus, the ability of the fastening to resist peel loads in such applications is generally limited by the ability of the hook to resist distention.

Further improvements in the overall design of palm tree fastener elements are desired. Preferably, such improved fastener elements will be readily and efficiently manufacturable without great advances in manufacturing methods.

SUMMARY

According to one aspect of the invention, a touch fastener component has a sheet-form base and an array of fastener elements. Each fastener element includes a stem and two heads extending from the stem. The stem extends outwardly from and integrally with the sheet-form base, and the two heads extend in essentially opposite directions in an engagement plane from a distal end of the stem, to corresponding tips. The fastener element has an upper surface that defines a well between the heads. Specifically, a height of a lowermost extent of the well, measured from and perpendicular to the sheet-form base, is less than 60 percent of an overall height of the fastener element, measured perpendicular to the sheet-form base.

In some embodiments, the height of the lowermost extent of the well is at least about 70 percent of an overall height of one of the two oppositely-directed heads, measured perpendicular to the base from the tip of the head to an uppermost extent of the head.

Preferably, each fastener element has an overall length between opposite extents of the heads, measured parallel to the base, of at least 1.8 times the overall height of the fastener element.

In some embodiments, a ratio of the overall height of each crook, measured perpendicular to the sheet-form base from the lowermost extent of the corresponding tip to an uppermost extent of the crook, to an entrance height measured perpendicular to the sheet-form base below a lowermost extent of the corresponding tip, is greater than 0.6.

Preferably the overall height of at least one of the two oppositely-directed heads, measured perpendicular to the base from the tip of the head to an uppermost extent of the head, is less than 60 percent of the overall height of the fastener element.

The ratio of an overall length of the fastener element, measured parallel to the sheet-form base in the engagement plane, to the height of the lowermost extent of the well, is preferably greater than 2.5.

Preferably, each fastener element has a mold release factor, defined as a ratio of a difference between a minimum solid length of the stem, measured parallel to the sheet-form base in side view, and a maximum solid length of the fastener element, measured parallel to the sheet-form base in side view above an elevation corresponding to the minimum solid length, to the minimum solid length of the stem, of less than 0.1. Such a low mold release factor promotes ready demolding from blind, fixed molding cavities.

In some embodiments, at least one of the heads has an overall height, measured perpendicular to the sheet-form base from a lowermost extent of the tip of the head to an uppermost extent of the head, that is greater than half of an overall height of the fastener element, measured perpendicular to the sheet-form base.

In some cases, the tips extend toward the base.

The lower surfaces of the heads, forming the crooks, are preferably arched.

In some cases, the heads and stem form a unitary molded structure, such as one in which the heads have surfaces of resin cooled against mold surfaces.

In some instances, the stem has opposing surfaces defined by severed resin, such as from being formed in a cut-and-stretch process.

In some applications, the stem and heads have side surfaces lying in parallel planes.

The crooks, in some embodiments, overhang surfaces of the stem. In preferred embodiments, the crooks overhang stem surfaces that extend at an inclination angle of between about 20 and 30 degrees with respect to a normal to the base.

In some applications, the touch fastener component includes a backing material laminated to a side of the base opposite the fastener elements. The backing material may provide reinforcement, or carry engageable loops, for example.

The fastener elements are preferably arranged in a density of at least 350 fastener elements per square inch of the base.

The fastener elements together preferably cover at least 20 percent of an overall surface area of the base from which the fastener elements extend.

According to another aspect of the invention, a touch fastener component has a sheet-form base and an array of fastener elements. Each fastener element includes a stem and two heads extending from the stem. The stem extends outwardly from and integrally with the sheet-form base, and the two heads extend in essentially opposite directions in an engagement plane from a distal end of the stem, to corresponding tips. The fastener element has an upper surface that defines a well between the heads. Specifically, the ratio of the overall height of at least one of the heads, measured perpendicular to the sheet-form base from a lowermost extent of the tip to an uppermost extent of the head, to the height of the lowermost extent of the well, measured from and perpendicular to the sheet-form base, is greater than 0.7.

Various preferred embodiments of this aspect of the invention include features described above with respect to the first aspect of the invention.

According to another aspect of the invention, a touch fastener component has a sheet-form base and an array of fastener elements. Each fastener element includes a stem and two heads extending from the stem. The stem extends outwardly from and integrally with the sheet-form base, and the two heads extend in essentially opposite directions in an engagement plane from a distal end of the stem, to corresponding tips. The fastener element has an upper surface that defines a well between the heads. Specifically, the ratio of the overall length of the fastener element, measured parallel to the sheet-form base in the engagement plane between opposite extents of the heads, to the height of the lowermost extent of the well, measured from and perpendicular to the sheet-form base, is greater than 2.5.

Various preferred embodiments of this aspect of the invention include features described above with respect to the first aspect of the invention.

According to another aspect of the invention, a touch fastener component has a sheet-form base and an array of fastener elements. Each fastener element includes a stem and two heads extending from the stem. The stem extends outwardly from and integrally with the sheet-form base, and the two heads extend in essentially opposite directions in an engagement plane from a distal end of the stem, to corresponding tips. The fastener element has an upper surface that defines a well between the heads. Each fastener element has a mold release factor, defined as a ratio of a difference between a minimum solid length of the stem, measured parallel to the sheet-form base in side view, and a maximum solid length of the fastener element, measured parallel to the sheet-form base in side view above an elevation corresponding to the minimum solid length, to the minimum solid length of the stem, of less than 0.1.

Various preferred embodiments of this aspect of the invention include features described above with respect to the first aspect of the invention.

Another aspect of the invention features a method of forming a touch fastener component having a sheet-form base and an array of fastener elements. Molten resin is introduced to a peripheral surface of a rotating mold roll defining an array of inwardly-extending cavities each including a stem region extending inwardly from the peripheral surface, and two head regions. The two head regions extend laterally in essentially opposite directions in an engagement plane from a distal end of the stem region to corresponding, blind tips. An inner surface of the cavity extending radially outward to form a protrusion between the head regions. Specifically, the radial distance from an outermost extent of the protrusion to the peripheral surface is less than 60 percent of an overall depth of the cavity, measured radially from the peripheral surface of the mold roll. Sufficient pressure is applied to force the resin into the cavities to mold an array of fastener elements having upper wells corresponding to the protrusions, while forming a sheet of the resin on the peripheral surface of the mold roll. The resin is cooled in the cavities. Finally, the fastener elements are freed from the mold cavities by stripping the sheet of resin from the surface of the mold roll, thereby pulling heads of the fastener elements formed in the head regions of the cavities through the stem regions of the cavities to remove the fastener elements from the cavities.

Another aspect of the invention features a method of forming a touch fastener component having a sheet-form base and an array of fastener elements. Molten resin is introduced to a peripheral surface of a rotating mold roll defining an array of inwardly-extending cavities each including a stem region extending inwardly from the peripheral surface, and two head regions. The two head regions extend laterally in essentially opposite directions in an engagement plane from a distal end of the stem region to corresponding, blind tips. An inner surface of the cavity extending radially outward to form a protrusion between the head regions. Specifically, the ratio of an overall height of at least one of the head regions, measured radially from an outermost extent of the tip to an innermost extent of the head region, to a radial distance from an outermost extent of the protrusion to the peripheral surface, is greater than 0.7. Sufficient pressure is applied to force the resin into the cavities to mold an array of fastener elements having upper wells corresponding to the protrusions, while forming a sheet of the resin on the peripheral surface of the mold roll. The resin is cooled in the cavities. Finally, the fastener elements are freed from the mold cavities by stripping the sheet of resin from the surface of the mold roll, thereby pulling heads of the fastener elements formed in the head regions of the cavities through the stem regions of the cavities to remove the fastener elements from the cavities.

Another aspect of the invention features a method of forming a touch fastener component having a sheet-form base and an array of fastener elements. Molten resin is introduced to a peripheral surface of a rotating mold roll defining an array of inwardly-extending cavities each including a stem region extending inwardly from the peripheral surface, and two head regions. The two head regions extend laterally in essentially opposite directions in an engagement plane from a distal end of the stem region to corresponding, blind tips. An inner surface of the cavity extending radially outward to form a protrusion between the head regions. Specifically, the ratio of an overall length of the cavity, measured circumferentially between opposite extents of the head regions, to a radial distance from an outermost extent of the protrusion to the peripheral surface, is greater than 2.5. Sufficient pressure is applied to force the resin into the cavities to mold an array of fastener elements having upper wells corresponding to the protrusions, while forming a sheet of the resin on the peripheral surface of the mold roll. The resin is cooled in the cavities. Finally, the fastener elements are freed from the mold cavities by stripping the sheet of resin from the surface of the mold roll, thereby pulling heads of the fastener elements formed in the head regions of the cavities through the stem regions of the cavities to remove the fastener elements from the cavities.

Another aspect of the invention features a method of forming a touch fastener component having a sheet-form base and an array of fastener elements. Molten resin is introduced to a peripheral surface of a rotating mold roll defining an array of inwardly-extending cavities each including a stem region extending inwardly from the peripheral surface, and two head regions. The two head regions extend laterally in essentially opposite directions in an engagement plane from a distal end of the stem region to corresponding, blind tips. An inner surface of the cavity extending radially outward to form a protrusion between the head regions. Specifically, the cavity defines a mold release factor, defined as a ratio of a difference between a minimum circumferential open length of the stem region and a maximum circumferential open length of the cavity at a tool roll radius smaller than that a radius corresponding to the minimum circumferential open length, to the minimum circumferential open length of the stem region, of less than 0.1. Sufficient pressure is applied to force the resin into the cavities to mold an array of fastener elements having upper wells corresponding to the protrusions, while forming a sheet of the resin on the peripheral surface of the mold roll. The resin is cooled in the cavities. Finally, the fastener elements are freed from the mold cavities by stripping the sheet of resin from the surface of the mold roll, thereby pulling heads of the fastener elements formed in the head regions of the cavities through the stem regions of the cavities to remove the fastener elements from the cavities.

Features of various embodiments of the method aspects of the invention are discussed above with respect to the product aspects of the invention.

The fastener element improvements disclosed herein can be useful in the formation of multiple-headed fastener elements with good performance properties when mated with loop materials for fastening. Some disclosed embodiments are particularly advantageous for engaging loops of high strength fibers, in allowing individual head distension without undue restriction by the opposing head. This can result in higher cycle life, in that the crooks are more likely to flex open without breaking an engaged loop. Some aspects of the invention are also most helpful in improving fastening performance when mating with low loft loops, resulting in particularly good hook strength for the overall thickness of the fastener product. Some of the features described herein are also useful in obtaining large palm tree crooks, for improved loop retention, along with good head distension performance under load. Low mold lock ratios have also been found to improve ease of manufacturing when demolding the fastener elements from fixed cavities.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
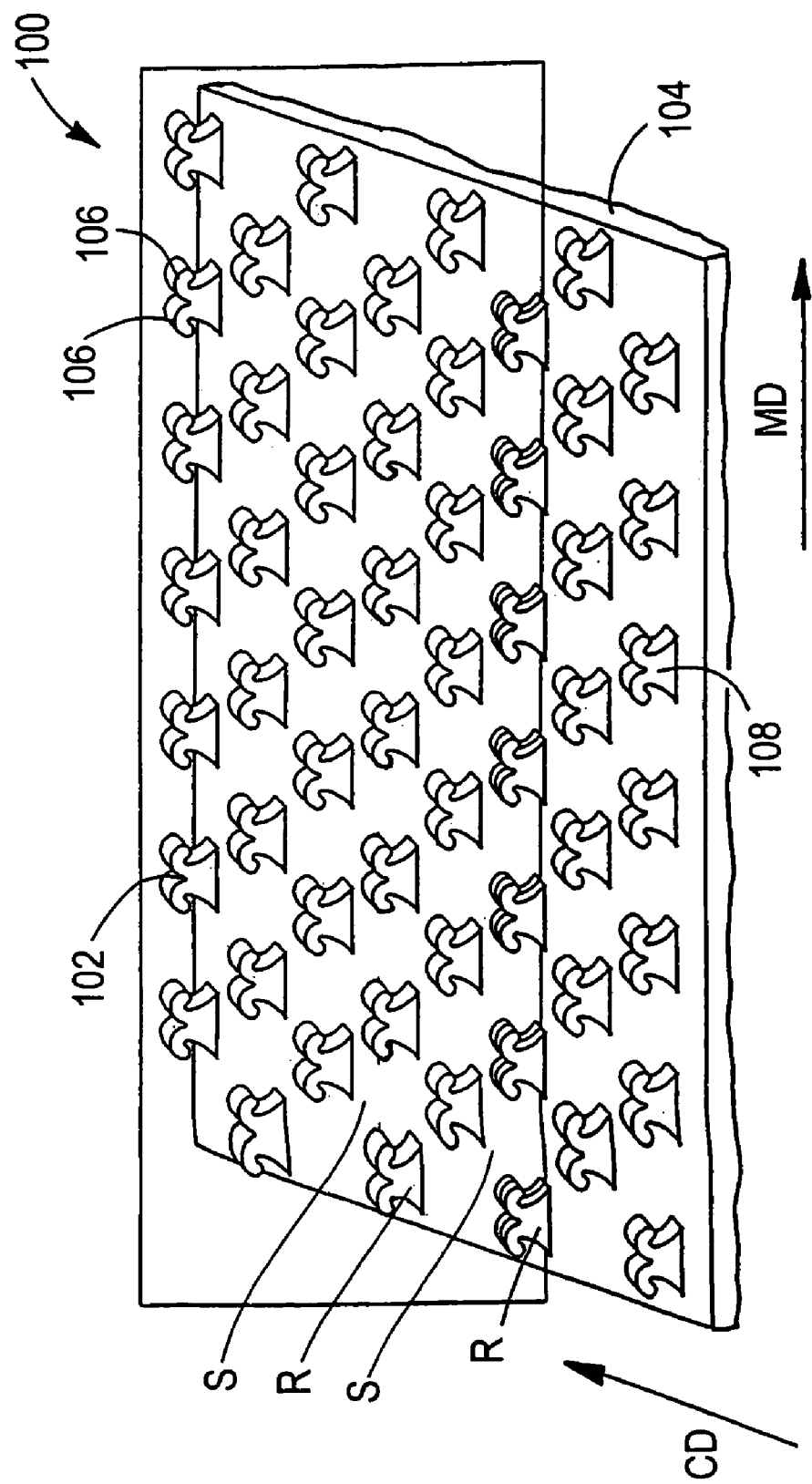
FIG. 1 is a perspective view of male fastener component with palm tree-shaped hooks.
Figure 2:
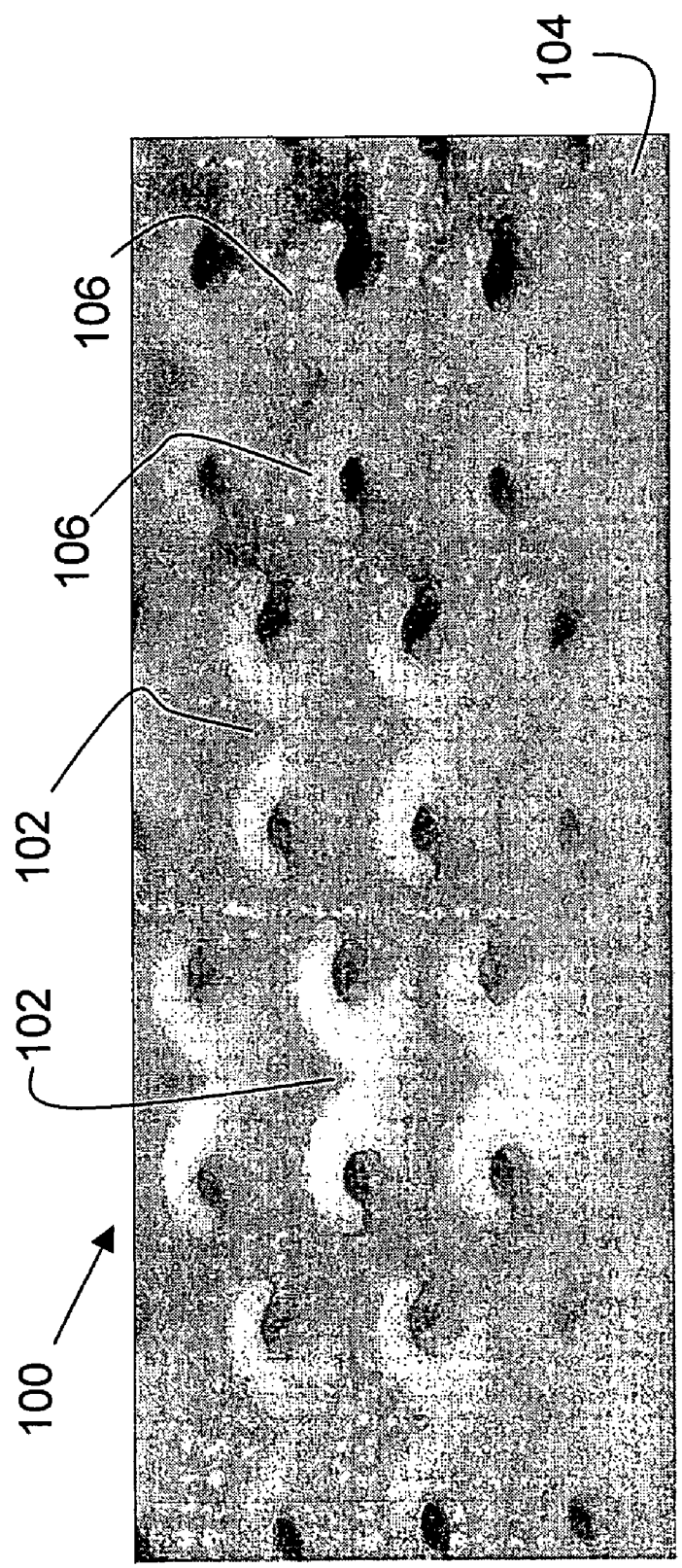
FIG. 2 is an enlarged photograph of an example of the fastener of FIG. 1.

Referring to FIGS. 1 and 2, a male touch fastener component 100 includes a field of fastener elements 102 arranged in rows R extending outwardly from and integrally with a sheet-form base 104. Spacing S between rows may be controlled by the manufacturing process and will be discussed further below. Fastener elements 102 are palm tree-shaped hooks and are engageable in two directions along a plane (i.e., an engagement plane) perpendicular to sheet-form base 104 the in direction of rows R. Each fastener element 102 includes two heads 106 extending from a single stem 108.

Male fastener component 100 is designed to, for example, strongly engage a low pile height, loop touch fastener component, particularly a loop component with loops formed of, for example, a high strength multifilament yarn or a high strength monofilament. High strength loops are desirable for fasteners for high strength applications requiring high cycle life, as the resist breakage at higher peel loads. Typically, high strength yarns and monofilaments are made by extrusion. Generally, the process includes a drawdown step to impart orientation on the yarn or monofilament so as to improve, for example, tenacity of the yarn or monofilament. High strength fibers may also be formed by other methods, for example, by solution spinning. Suitable high strength loop filament materials include, for example, polyamides, polyesters, polyurethanes, ultra-high molecular weight solution spun polyethylene (e.g., SPECTRA® polyethylene), aramids (e.g., KEVLAR®), acrylics and rigid rod polymers like poly(p-phenylene-2,6-benzobisoxazole).

Figure 3:
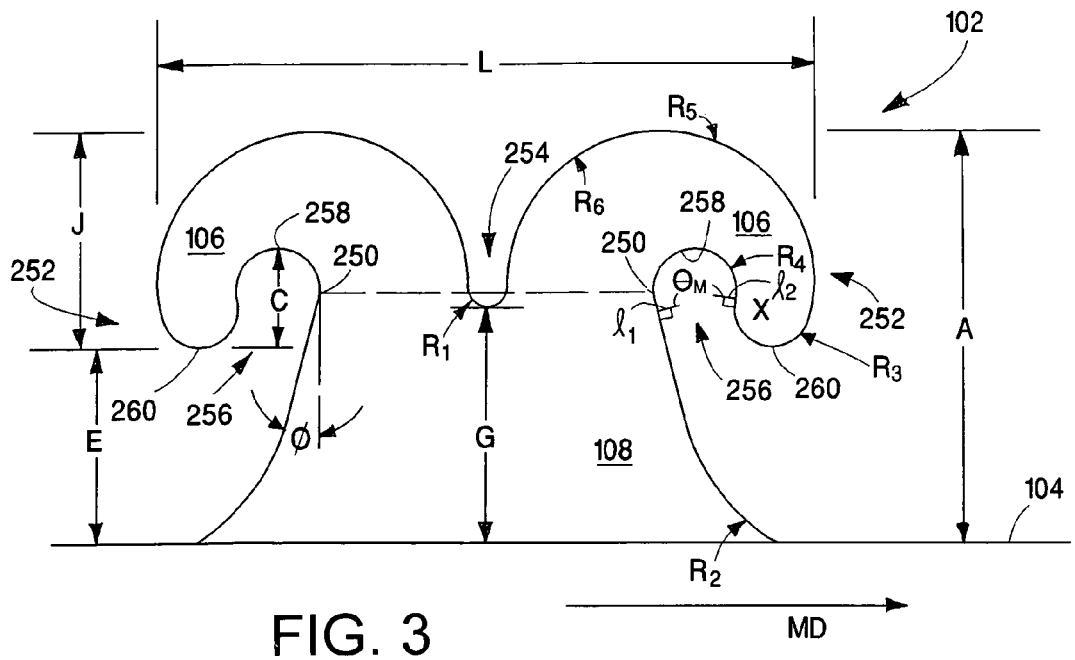
FIG. 3 is an enlarged side view of one of the fastener elements.
Figure 3A:
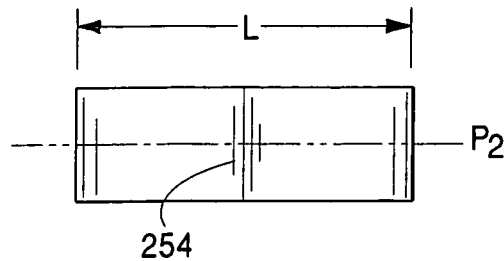
FIGS. 3A and 3B are top and end views, respectively, of the fastener element of FIG. 3.
Figure 3B:
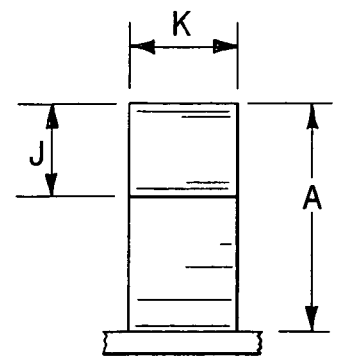

Referring now to FIGS. 3, 3A and 3B, fastener element 102 has a substantially constant thickness from base to tip, and includes a stem 108 extending outwardly from and molded integrally with sheet-form base 104. For purposes of the present disclosure, we refer to the stem 108 as beginning at the upper surface of base 104 and ending at an elevation where the inner crook surface is perpendicular to the base, an elevation 250 above which the inner crook surface begins to overhang the stem 108 or sheet-form base. Fastener element 102 also includes two heads 106 extending in essentially opposite directions in an engagement plane. Heads 106 extend from distal end 250 of the stem to corresponding, oppositely-directed tips 252. Thus, fastener element 102 is an example of what is known in the art as a 'palm-tree' fastener element. The heads 106 have upper surfaces that alone or together with the stem define a well 254 between the heads. Each head 106 has a lower surface that rises up through an apex 258 and then falls again, forming an arched crook 256 for retaining loops of a mating female touch fastener component.

The overall height A of fastener element 102 is measured in side view perpendicular to sheet-form base 104 from the top of the sheet-form base. Under crook height C is the distance measured in side view, perpendicular to the sheet-form base, between the lowermost extent of the tip 260 and the apex 258 of the crook. Entrance height E is the distance measured in side view, perpendicular to the sheet-form base, from the top of the sheet-form base to the lowermost extent of tip 260. If part of the stem is directly below the lowermost extent of the tip 260, then the distance is measured from that portion of the stem directly below to the lowermost extent of the tip 260. Head height J of fastener element 102 is measured perpendicular to sheet-form base 104 from the lowermost extent of tip 260 to the highest elevation of the head 106 above the base. In general, J will be the difference between A and E. Well height G is measured in side view from the lower extent of stem 108 to the lower extent of well 256 defined in the upper surface of the fastener element between the heads.

Width L of the fastener element is measured in side view and is the maximum lateral extent of the fastener element heads 106 as measured parallel to the sheet-form base. Hook thickness K is the overall thickness of the fastener element, taken at elevation 250 corresponding to the upper end of stem 108. In most cases other than instances where the heads have been formed subsequent to stem molding, the heads will lie completely within this hook thickness K. In the example shown, hook thickness is the same at all elevations. The product of head width L and thickness K we call the footprint of the fastener element, and is related to the area of contact between the hook product and a mating loop product during initial engagement, although it will be understood to not be an exact measure of such contact area. The product of footprint and head height J (i.e., K×L×J) we refer to as displacement volume. For a more detailed explanation of the relevance of hook volume to fastener performance, see Provost, U.S. Pat. No. 5,315,740, the contents of which are incorporated herein by reference.

The front and rear surfaces of the stem define, in side profile, inclination angles φ of about 23 degrees with respect to vertical, with the width of the stem tapering to narrower away from the base, both for strength and ease of molding.

Under crook angle $\theta_m$ is an angle defined in the crook by inner surfaces of the head and stem, between a pair of line segments perpendicular to facing surfaces of the fastener element, in side view. Line segment $1_1$ is perpendicular to the forward edge of stem 108 at the elevation of the distal tip 260 of the head. Line segment $1_2$ is perpendicular to the under crook surface of the head at a point of inflection 'X' of the under head surface. In cases where there is not a smooth curvature transition inside the tip, such as where the underside of the head forms a sharp corner adjacent the tip, line segment $1_2$ should be taken as perpendicular to the underside surface of the head just above such a corner or discontinuity. As shown, angle $\theta_m$ is measured from the upper side of line segment $1_1$, about the crook, to the upper side of line segment $1_2$. For this illustrated example, $\theta_m$ is 201 degrees.

The linear and radial dimensions of the example illustrated in FIGS. 3, 3A and 3B are as follows:

| Dimension | Inches | Millimeters |
|---|---|---|
| A | 0.025 | 0.635 |
| C | 0.0064 | 0.163 |
| E | 0.0105 | 0.267 |
| G | 0.0122 | 0.310 |
| J | 0.0145 | 0.368 |
| K | 0.012 | 0.305 |
| L | 0.0497 | 1.262 |
| $R_1$ | 0.0011 | 0.279 |
| $R_2$ | 0.0090 | 0.229 |
| $R_3$ | 0.0026 | 0.066 |
| $R_4$ | 0.0040 | 0.102 |
| $R_5$ | 0.0107 | 0.272 |
| $R_6$ | 0.0164 | 0.417 |

These values result in a footprint of $5.96 \times 10^{-4}$ square inches (0.00385 cm$^2$), and a displacement volume of about $8.65 \times 10^{-6}$ cubic inches (0.000142 cm$^3$). Given a hook density of 380 fastener elements per square inch, the overall fastener component has an overall hook footprint of 22.6 percent of the overall array area.

Some examples have varying thickness, and non-planar sides. For example, the fastener element 102a of FIGS. 4, 4A and 4B has a greatest thickness at its base, and tapers in thickness to the distal tips of the heads. However, as seen in side view, fastener element 102a has the same profile as shown in FIG. 3, and approximately the same dimensions listed above also apply to this example.

Not all palm-tree fastener elements have two identical crooks. For example, some palm-tree fastener elements are intentionally formed to have one head extending up higher than the other, such as to engage loops of differing heights. Also, some palm-tree hooks are molded to have two identical crooks, but later processing alters one crook more than the other, such as discussed below.

Figure 5:
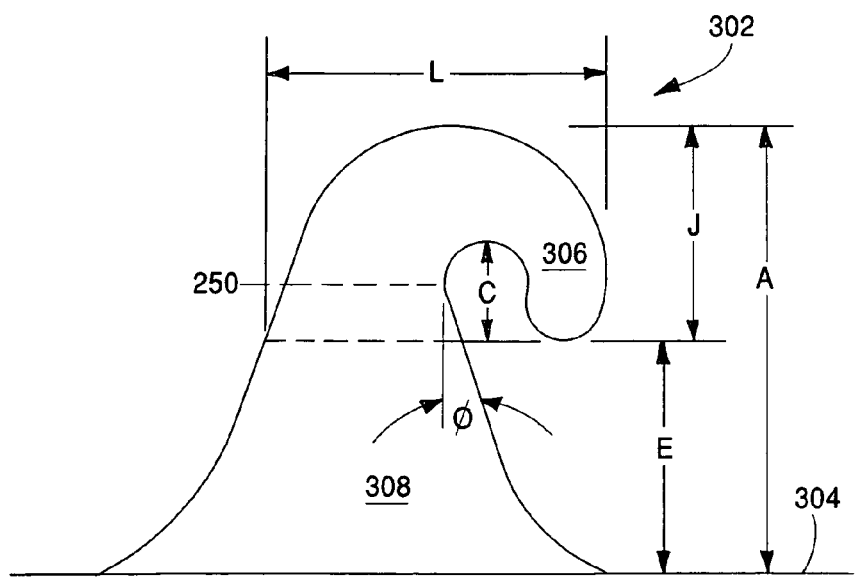
FIGS. 5 and 6 illustrate alternate molding processes for forming the fastener components.
Figure 4:
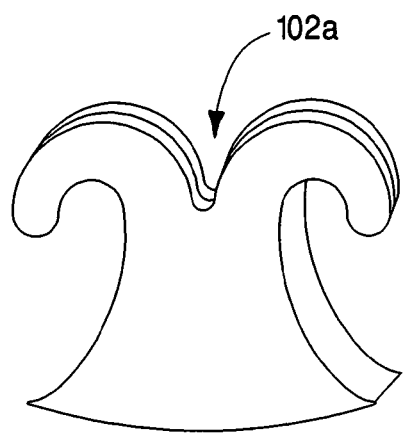
FIG. 4 is a perspective view of an alternate palm tree hook shape.
Figure 4A:
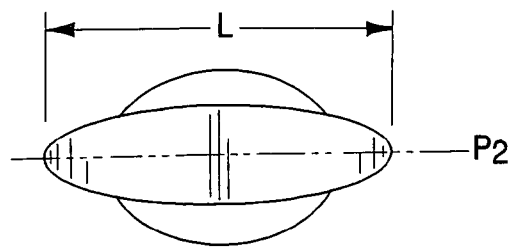
FIGS. 4A and 4B are top and end views, respectively, of the fastener element of FIG. 4.

The fastener elements of FIGS. 3 and 4 can be molded in the shapes shown. Referring to FIG. 5, thermoplastic resin 200 is extruded as a molten sheet from extruder 202 and introduced into nip 204 formed between a pressure roll 206 and a counter-rotating mold roll 208 defining fastener element-shaped cavities in its surface. Pressure in the nip causes thermoplastic resin 200 to enter these blind-ended forming cavities to form the fastener elements, while excess resin remains about the periphery of the mold roll and is molded between the rolls to form sheet-form base 104. The thermoplastic resin is cooled as it proceeds along the periphery of the mold roll, solidifying the fastener elements, until it is stripped by stripper roll 212. The molded fastener elements distend during de-molding, but tend to recover substantially their as-molded shape. It is generally understood that fastener element crooks molded to face downstream tend to distend slightly more than those molded to face upstream, and can remain more distended in the final product. The direction of travel of the material illustrated in FIG. 5 is referred to as the "machine direction" (MD) of the material and defines the longitudinal direction of the resulting product, while the cross-machine direction (CD) is perpendicular to the machine direction within the plane of the sheet-form base. Further details regarding processing are described by Fischer, U.S.

Pat. No. 4,775,310 and Clune et al., U.S. Pat. No. 6,202,260, the disclosures of which are hereby incorporated in full by reference.

In some embodiments, the mold roll 208 comprises a face-to-face assembly of thin, circular plates or rings (not shown) that are, for example, about 0.003 inch to about 0.250 inch (0.0762 mm-6.35 mm) thick, some having cutouts in their periphery defining mold cavities and others having solid circumferences, serving to close the open sides of the mold cavities and serve as spacers, defining the spacing between adjacent fastener element rows. A fully "built up" mold roll may have a width, for example, from about 0.75 inch to about six inches (1.91 cm-15.24 cm) or more and may contain, for example, from about 50 to 1000 or more individual rings. Further details regarding mold tooling are described by Fisher, U.S. Pat. No. 4,775,310. Additional tooling embodiments will also be described below.

The cavities that made the fastener element shown in FIGS. 3-3B have sharp edges and straight sidewalls and create fastener elements with substantially similar cross-sections through the thickness of the fastener element. Tooling with straight sidewalls and edges can be made by, for example, laser cutting, wire EDM or electroforming. Further details regarding laser cutting and wire EDM mold tooling is described by Fisher, U.S. Pat. No. 4,775,310. The electroforming process is described by Clarner et al., U.S. Ser. No. 10/455,240, the disclosure of which is hereby incorporated in full by reference.

Figure 4B:
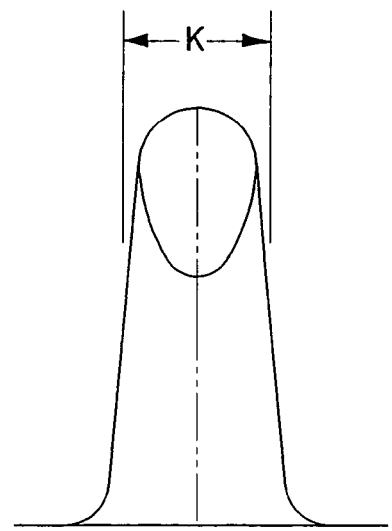

By contrast, fastener elements formed in cavities that have been, for example, photochemically etched may have rounded surfaces in some or all regions, from base to tip, such as those illustrated in FIGS. 4-4B. For example, surfaces at the top of the heads can be made to taper to a point to give a wedge effect. A wedge-shape may, for example, assist the entry of the crook into the face of a mating female fastener component. Further details regarding photochemical etching is described in Lacey et al., U.S. Pat. No. 6,163,939, the entire disclosure of which is hereby incorporated in full by reference.

Figure 6:
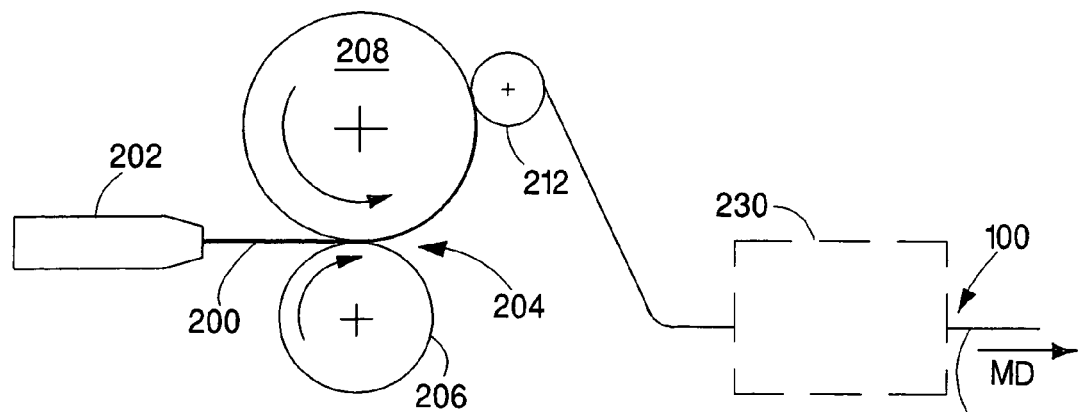
Figure 6A:
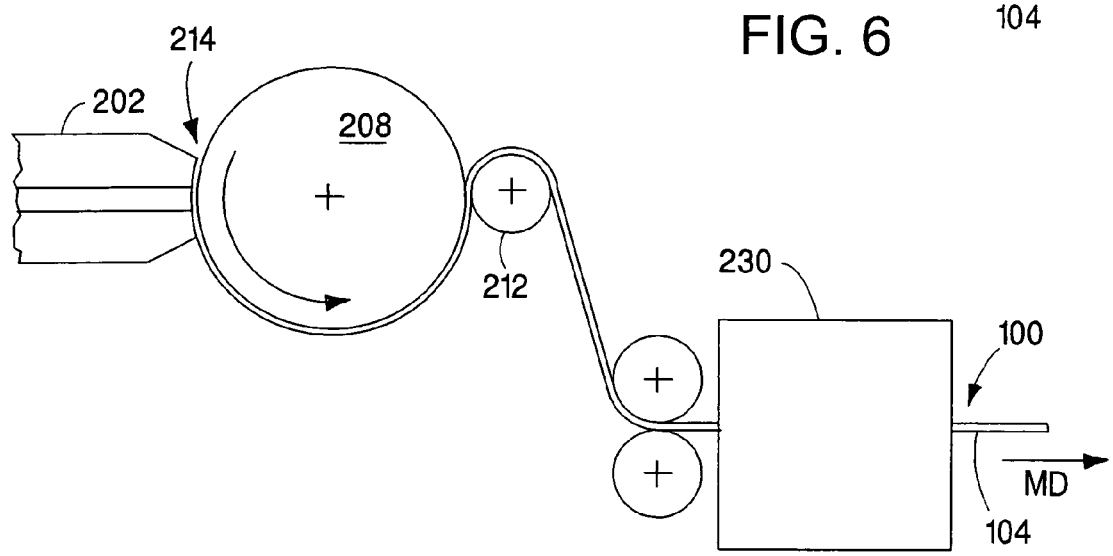

An alternate technique for molding fastener elements is shown in FIG. 6. The process is similar to that described above with reference to FIG. 5, except only a mold roll 208 is used, i.e., no pressure roll 206 is necessary. Here, the extruder 202 is shaped to conform to the periphery of the mold roll 208 and the extruded resin 200 is introduced under pressure directly to a gap 214 formed between mold roll 208 and extruder 202. The molded fastener component is stripped from the mold cavities by a stripper roll 212 as described above. Further details regarding this process are described by Akeno, U.S. Pat. Nos. 5,781,969 and 5,913,482, the disclosures of which are hereby incorporated in full by reference.

Figure 7:
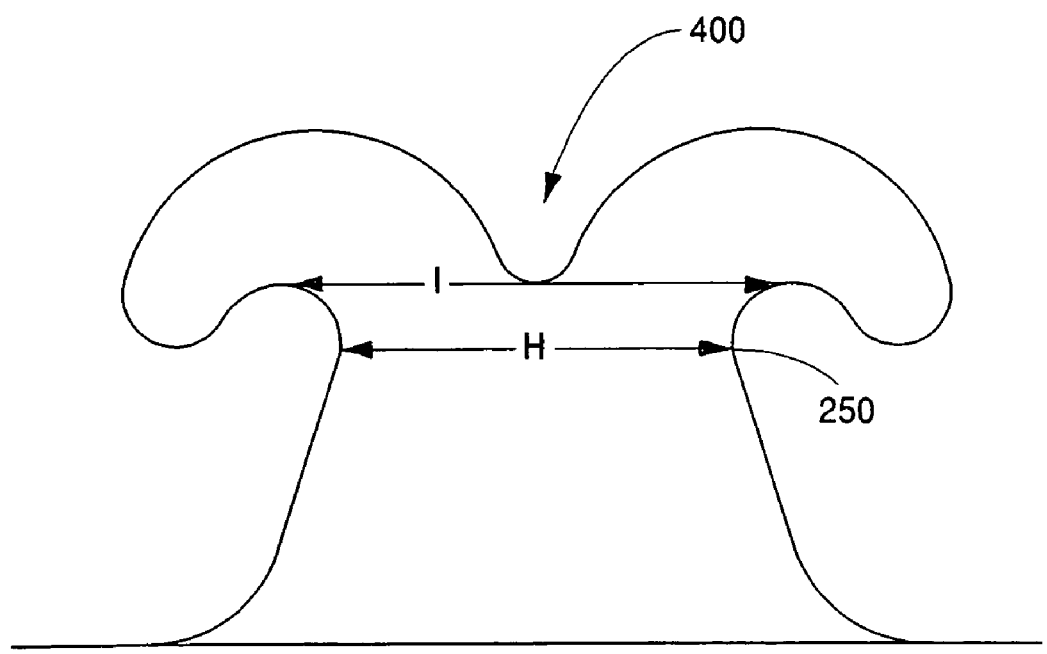
FIG. 7 is an enlarged side view of a prior art palm tree-shaped fastener element.

FIG. 7 helps to illustrate the concept I call mold release factor (MRF). Palm tree fastener element 400 has a minimum solid length H of the stem, measured parallel to the sheet-form base in side view, and a maximum solid length I, measured parallel to the sheet-form base in side view, at or above the elevation of minimum solid height. By solid length, I mean the length, measured fore and aft and parallel to the base, along which a continuous line segment can be drawn within the hook profile. The mold release factor MRF is the ratio of the difference between the minimum solid length H and the maximum solid length I above the plane of minimum solid length H, to the minimum solid length H, according to the equation MRF=(I–H)/H. It will be understood that the maximum solid length of the fastener element, above the elevation of minimum solid height, is related to an amount of molded resin that must be pulled through the narrowest portion of the stem portion of the mold cavity.

Taking FIG. 7 as a side view of a mold cavity in which the fastener element is molded, such as in the mold roll 208 of FIG. 5, H represents the minimum circumferential open length of the stem region of the cavity, while I represents the maximum circumferential open length of the cavity at a tool roll radius smaller than that the radius corresponding to the minimum circumferential open length H.

Referring back to FIG. 3, for fastener element 102 the values of I and H are equal, as they are found at the same elevation above the base, at the narrowest part of the stem. Therefore, the mold release factor MRF for hook 102 is zero. For molding palm tree-type fastener elements, maintaining a low mold release factor, such as below 0.1, helps in removing the molded fastener elements without opening the mold cavities. It is also believed to help prevent mold fouling and wear, and decreases permanent distention of the hook heads.

Figure 8:
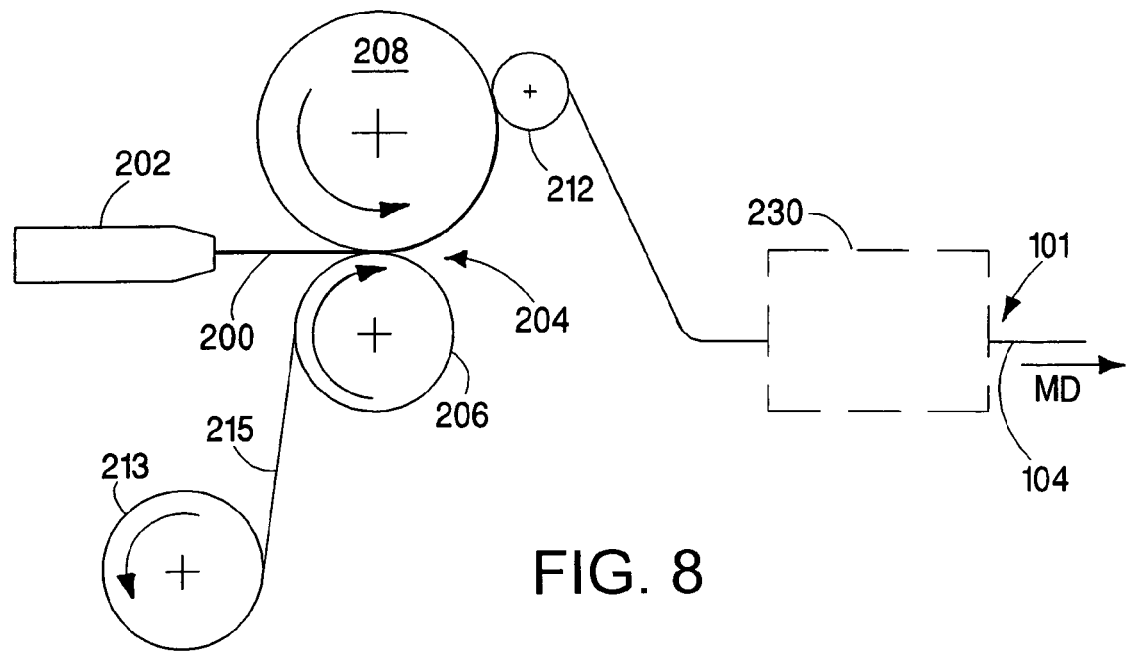
FIG. 8 illustrates a process for forming a laminated fastener.
Figure 9:
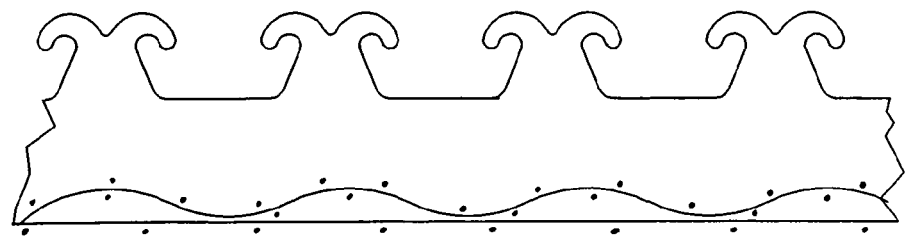
FIG. 9 is an enlarged cross-section of a product formed by the process of FIG. 8.

Referring to FIGS. 8 and 9, a laminated male touch fastener component 101 may be formed by introducing a pre-form material 215 into nip 204 between the mold and pressure rolls. As a result of the heat and pressure in nip 204, pre-form material 215 becomes laminated and bonded to the thermoplastic resin 200 simultaneously with the forming of the fastener elements. The result can be a contiguous molded structure, without weld lines, extending from the tips of the fastener elements into the pre-form material, where the resin can intimately bond with features or fibers of the material to form a strong, permanent bond. Further details regarding this process are described by Kennedy et al., U.S. Pat. No. 5,260,015, the disclosures of which is hereby incorporated in full by reference. In one useful embodiment, pre-formed material 215 is a loose knit scrim, such as Knit 3901 from Velcro USA in Manchester, N.H., although Velcro USA loop products 3900, 3905, and 3400 may also be employed.

In some cases, the fastener elements are not molded in their final form. In any of the methods disclosed above, for example, the fastener component may be routed through subsequent processing station 230 to finalize the form of the fastener elements. Flat-sided fastener elements with the profile shown in FIG. 3 can also be formed by a cut-and-stretch method, such as the method disclosed in Nestegard, U.S. Pat. No. 4,895,569, for example. In such processes, moldable resin is extruded through a die with openings shaped in the desired hook profile, then the extruded rails are cut transverse to the extrusion direction, and the base stretched in the extrusion direction to separate the rails into rows of discrete fastener elements. This procedure results in fastener elements with broad sides that are cut rather than molded, as in the processes described above, and with profile edges formed by sliding resin through a shaped die rather than a filling cavity.

A number of embodiments of the invention have been described. Nevertheless, it will be understood that various modifications may be made without departing from the spirit and scope of the invention. Accordingly, other embodiments are within the scope of the following claims.

What is claimed is:

1. A touch fastener component having a sheet-form base and an array of fastener elements, each fastener element comprising:

a stem extending outwardly from and integrally with the sheet-form base, and two heads extending in essentially opposite directions in an engagement plane from a distal end of the stem to corresponding tips, each head having a lower surface forming a crook for retaining loops, the fastener element having an upper surface that defines a well between the heads;

wherein a height of a lowermost extent of the well, measured from and perpendicular to the sheet-form base, is less than 60 percent of an overall height of the fastener element, measured perpendicular to the sheet-form base; and wherein each fastener element has an overall length between opposite extents of the heads, measured parallel to the base, of at least 1.8 times the overall height of the fastener element.

2. A touch fastener component having a sheet-form base and an array of fastener elements, each fastener element comprising:

a stem extending outwardly from and integrally with the sheet-form base, and two heads extending in essentially opposite directions in an engagement plane from a distal end of the stem to corresponding tips, each head having a lower surface forming a crook for retaining loops, the fastener element having an upper surface that defines a well between the heads;

wherein a height of a lowermost extent of the well, measured from and perpendicular to the sheet-form base, is less than 60 percent of an overall height of the fastener element, measured perpendicular to the sheet-form base; and wherein the tips extend toward the base.

3. A touch fastener component having a sheet-form base and an array of fastener elements, each fastener element comprising:

a stem extending outwardly from and integrally with the sheet-form base, and two heads extending in essentially opposite directions in an engagement plane from a distal end of the stem to corresponding tips, each head having a lower surface forming a crook for retaining loops, the fastener element having an upper surface that defines a well between the heads;

wherein a height of a lowermost extent of the well, measured from and perpendicular to the sheet-form base, is less than 60 percent of an overall height of the fastener element, measured perpendicular to the sheet-form base; and wherein the lower surfaces of the heads are arched.

4. A touch fastener component having a sheet-form base and an array of fastener elements, each fastener element comprising:

a stem extending outwardly from and integrally with the sheet-form base, and two heads extending in essentially opposite directions in an engagement plane from a distal end of the stem to corresponding tips, each head having a lower surface forming a crook for retaining loops, the fastener element having an upper surface that defines a well between the heads;

wherein a height of a lowermost extent of the well, measured from and perpendicular to the sheet-form base, is less than 60 percent of an overall height of the fastener element, measured perpendicular to the sheet-form base;

wherein the crooks overhang surfaces of the stem; and wherein the crooks overhang stem surfaces that extend at an inclination angle of between about 20 and 30 degrees with respect to a normal to the base.

5. A touch fastener component having a sheet-form base and an array of fastener elements, each fastener element comprising:

a stem extending outwardly from and integrally with the sheet-form base, and two heads disposed at a distal end of the stem and extending in essentially opposite directions in an engagement plane to corresponding tips, each head having a lower surface forming a crook for retaining loops, the fastener element having an upper surface that defines a well between the heads;

wherein a ratio of an overall height of at least one of the heads, measured perpendicular to the sheet-form base from a lowermost extent of the tip to an uppermost extent of the head, to a height of a lowermost extent of the well, measured from and perpendicular to the sheet-form base, is greater than 0.7; and wherein each fastener element has an overall length between opposite extents of the heads, measured parallel to the base, of at least 1.8 times an overall height of the fastener element, measured from and perpendicular to the base.

6. A touch fastener component having a sheet-form base and an array of fastener elements, each fastener element comprising:

a stem extending outwardly from and integrally with the sheet-form base, and two heads disposed at a distal end of the stem and extending in essentially opposite directions in an engagement plane to corresponding tips, each head having a lower surface forming a crook for retaining loops, the fastener element having an upper surface that defines a well between the heads;

wherein a ratio of an overall height of at least one of the heads, measured perpendicular to the sheet-form base from a lowermost extent of the tip to an uppermost extent of the head, to a height of a lowermost extent of the well, measured from and perpendicular to the sheet-form base, is greater than 0.7; and wherein the tips extend toward the base.

7. A touch fastener component having a sheet-form base and an array of fastener elements, each fastener element comprising:

a stem extending outwardly from and integrally with the sheet-form base, and two heads disposed at a distal end of the stem and extending in essentially opposite directions in an engagement plane to corresponding tips, each head having a lower surface forming a crook for retaining loops, the fastener element having an upper surface that defines a well between the heads;

wherein a ratio of an overall height of at least one of the heads, measured perpendicular to the sheet-form base from a lowermost extent of the tip to an uppermost extent of the head, to a height of a lowermost extent of the well, measured from and perpendicular to the sheet-form base, is greater than 0.7;

wherein the crooks overhang surfaces of the stem; and wherein the crooks overhang stem surfaces that extend at an inclination angle of between about 20 and 30 degrees with respect to a normal to the base.

8. A touch fastener component having a sheet-form base and an array of fastener elements, each fastener element comprising:

a stem extending outwardly from and integrally with the sheet-form base, and two heads disposed at a distal end of the stem and extending in essentially opposite directions in an engagement plane to corresponding tips, each head having a lower surface forming a crook for retaining loops, the fastener element having an upper surface that defines a well between the heads;

wherein a ratio of an overall length of the fastener element, measured parallel to the sheet-form base in the engagement plane between opposite extents of the heads, to a height of a lowermost extent of the well, measured from and perpendicular to the sheet-form base, is greater than 2.5; and wherein the overall length of the fastener element is at least 1.8 times an overall height of the fastener element, measured from and perpendicular to the base.

9. A touch fastener component having a sheet-form base and an array of fastener elements, each fastener element comprising:

a stem extending outwardly from and integrally with the sheet-form base, and two heads disposed at a distal end of the stem and extending in essentially opposite directions in an engagement plane to corresponding tips, each head having a lower surface forming a crook for retaining loops, the fastener element having an upper surface that defines a well between the heads;

wherein a ratio of an overall length of the fastener element, measured parallel to the sheet-form base in the engagement plane between opposite extents of the heads, to a height of a lowermost extent of the well, measured from and perpendicular to the sheet-form base, is greater than 2.5; and wherein a ratio of an overall height of each crook, measured perpendicular to the sheet-form base from a lowermost extent of the corresponding tip to an uppermost extent of the crook, to an entrance height measured perpendicular to the sheet-form base below a lowermost extent of the corresponding tip, is greater than 0.6.

10. A touch fastener component having a sheet-form base and an array of fastener elements, each fastener element comprising:

a stem extending outwardly from and integrally with the sheet-form base, and two heads disposed at a distal end of the stem and extending in essentially opposite directions in an engagement plane to corresponding tips, each head having a lower surface forming a crook for retaining loops, the fastener element having an upper surface that defines a well between the heads;

wherein a ratio of an overall length of the fastener element, measured parallel to the sheet-form base in the engagement plane between opposite extents of the heads, to a height of a lowermost extent of the well, measured from and perpendicular to the sheet-form base, is greater than 2.5;

wherein the crooks overhang surfaces of the stem; and wherein the crooks overhang stem surfaces that extend at an inclination angle of between about 20 and 30 degrees with respect to a normal to the base.

11. A touch fastener component having a sheet-form base and an array of fastener elements, each fastener element comprising:

a molded stem extending outwardly from and integrally with the sheet-form base, and two heads disposed at a distal end of the stem and extending in essentially opposite directions in an engagement plane to corresponding tips, each head having a lower surface forming a crook for retaining loops, the fastener element having an upper surface that defines a well between the heads;

wherein each fastener element has a mold release factor, defined as a ratio of a difference between a minimum solid length of the stem, measured parallel to the sheet-form base in side view, and a maximum solid length of the fastener element, measured parallel to the sheet-form base in side view above an elevation corresponding to the minimum solid length, to the minimum solid length of the stem, of less than 0.1; and wherein the overall length of the fastener element is at least 1.8 times an overall height of the fastener element, measured from and perpendicular to the base.

12. A touch fastener component having a sheet-form base and an array of fastener elements, each fastener element comprising:

a molded stem extending outwardly from and integrally with the sheet-form base, and two heads disposed at a distal end of the stem and extending in essentially opposite directions in an engagement plane to corresponding tips, each head having a lower surface forming a crook for retaining loops, the fastener element having an upper surface that defines a well between the heads;

wherein each fastener element has a mold release factor, defined as a ratio of a difference between a minimum solid length of the stem, measured parallel to the sheet-form base in side view, and a maximum solid length of the fastener element, measured parallel to the sheet-form base in side view above an elevation corresponding to the minimum solid length, to the minimum solid length of the stem, of less than 0.1; and wherein a ratio of an overall height of each crook, measured perpendicular to the sheet-form base from a lowermost extent of the corresponding tip to an uppermost extent of the crook, to an entrance height measured perpendicular to the sheet-form base below a lowermost extent of the corresponding tip, is greater than 0.6.

13. A touch fastener component having a sheet-form base and an array of fastener elements, each fastener element comprising:

a molded stem extending outwardly from and integrally with the sheet-form base, and two heads disposed at a distal end of the stem and extending in essentially opposite directions in an engagement plane to corresponding tips, each head having a lower surface forming a crook for retaining loops, the fastener element having an upper surface that defines a well between the heads;

wherein each fastener element has a mold release factor, defined as a ratio of a difference between a minimum solid length of the stem, measured parallel to the sheet-form base in side view, and a maximum solid length of the fastener element, measured parallel to the sheet-form base in side view above an elevation corresponding to the minimum solid length, to the minimum solid length of the stem, of less than 0.1;

wherein the crooks overhang surfaces of the stem; and wherein the crooks overhang stem surfaces that extend at an inclination angle of between about 20 and 30 degrees with respect to a normal to the base.

* * * * *